United States Patent [19]
Theckston

[11] 3,936,901
[45] Feb. 10, 1976

[54] WIPER BLADE WITH EMBEDDED HEATING ELEMENT

[76] Inventor: Dana L. Theckston, 16440 15th Ave. S.W., Seattle, Wash. 98166

[22] Filed: Sept. 17, 1974

[21] Appl. No.: 506,895

[52] U.S. Cl. .......................... 15/250.04; 15/250.06
[51] Int. Cl.² ......................................... B60S 1/46
[58] Field of Search ................... 15/250.01–250.09

[56] References Cited
UNITED STATES PATENTS

| | | | |
|---|---|---|---|
| 2,069,699 | 2/1937 | Dohler | 15/250.04 |
| 2,354,440 | 7/1944 | Brown | 15/250.04 |
| 2,755,499 | 7/1956 | Mays | 15/250.06 |
| 2,865,040 | 12/1958 | Hamm | 15/250.06 |
| 3,249,959 | 5/1966 | Theckston | 18/250.06 |
| 3,372,421 | 3/1968 | Meltzer | 15/250.06 |
| 3,427,675 | 2/1969 | Tibbet | 15/250.05 X |
| 3,523,626 | 8/1970 | Racine et al. | 15/250.07 |
| 3,574,881 | 4/1971 | Temple | 15/250.04 |

FOREIGN PATENTS OR APPLICATIONS 1,901,407  8/1970  Germany ...................... 15/250.05

*Primary Examiner*—Peter Feldman
*Attorney, Agent, or Firm*—Clarence A. O'Brien; Harvey B. Jacobson

[57] ABSTRACT

A heated windshield wiper assembly having a heat resistant flexible blade element provided with an electrical heating arrangement disposed in a cavity of the blade element. The heating arrangement includes a resistance element encased in the blade element for heating water fed into the cavity and out holes in the blade element onto an associated windshield. The resistance element is advantageously a wire arranged in a folded non-conductive tubular member encased in the blade element. A non-conductive coil encircling the tubular member for holding same in a folded condition so that the tubular member will uniformly distribute heat transferred to the tubular member from the resistance wire.

9 Claims, 6 Drawing Figures

U.S. Patent  Feb. 10, 1976  3,936,901
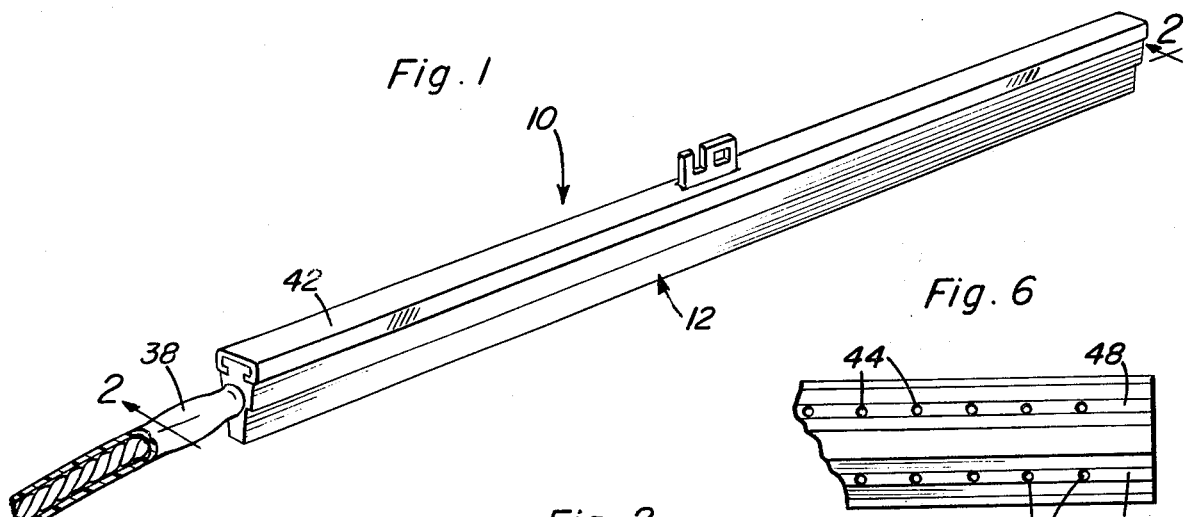
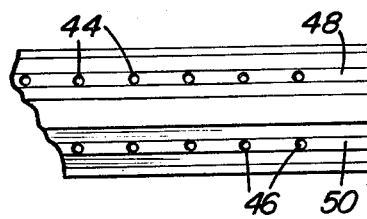
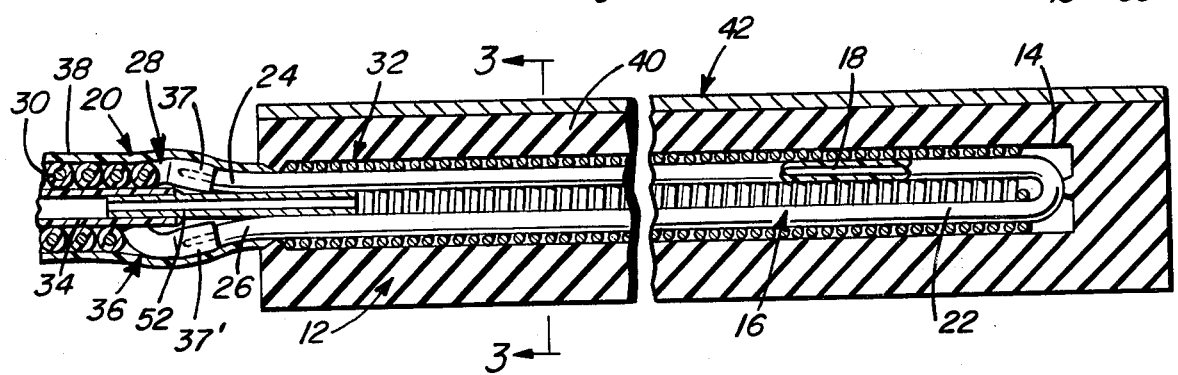
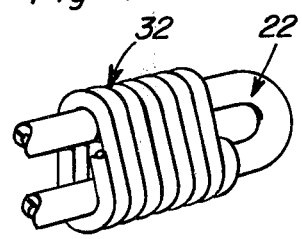
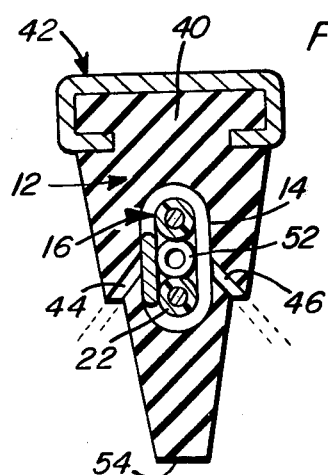
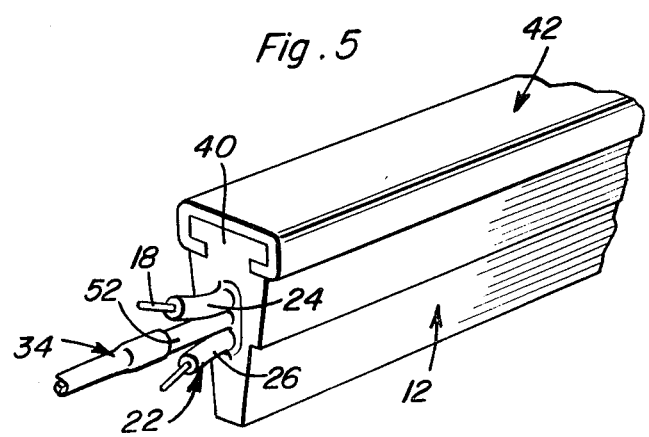

WIPER BLADE WITH EMBEDDED HEATING ELEMENT

BACKGROUND OF THE INVENTION

1. Field of the Invention

This invention relates generally to an electrically heated windshield wiper assembly, and particularly to such a wiper assembly having an internal cavity through which heated and unheated water may flow to an associated windshield. Advantageously, the wiper assembly according to the present invention embodies heat and water facilities for facilitating removal of ice and precipitation under freezing conditions from the windshield of a vehicle, and also to the removal of highway grime in summer by means of heat and water used in appropriate combination.

2. Description of the Prior Art

The present invention represents a development on the windshield wiper assemblies disclosed in my prior U.S. Pat. Nos. 2,923,022, issued Feb. 2, 1960, and 3,249,959, issued May 10, 1966.

SUMMARY OF THE INVENTION

An object of the present invention is to provide a heated type of wiper blade construction capable of dissipating a requisite quantity of heat and water onto an associated windshield being wiped by the blade in a more efficient manner than known wiper blades of this kind so as to reduce the drain of electrical energy to a lower and more practical value for vehicle installations. It is another object of the present invention to provide a wiper blade construction wherein the heating facilities are mounted in a novel manner for uniform distribution of the heat.

It is yet another object of the present invention to provide a heated wiper blade construction which is economical in cost and capable of being tailored to various installational requirements.

It is yet another object of the present invention to provide a wiper blade assembly through which heat and/or water may be distributed onto a surface being wiped, so as to facilitate the cleaning process of the windshield without wasting the supply of vehicular water.

These and other objects are achieved according to the present invention by providing a heated windshield wiper assembly having: a heat resistant flexible blade element provided with an internal cavity for receiving water; and an electrical heating assembly encased in the blade element for uniformly distributing heat throughout the blade element and heating water in the cavity. The heating arrangement advantageously includes a resistance element coupled to a source of electrical energy.

The heating arrangement advantageously further includes a heat distributing element in the form of a flexible, tubular member encased in the blade element and constructed from a non-conductive material. The tubular member may be arranged extending in a folded condition along the length of the blade element for flexing therewith. The resistance element will include a resistance wire extending through the tubular member and arranged for generating heat in response to a flow of electrical current through the resistance wire.

The heating arrangement still further advantageously includes a non-conductive coil arranged encircling the tubular member for holding same in the folded condition, whereby heat is uniformly distributed throughout the blade element.

The blade element preferably has a head portion, and a conductive, rigid blade holder is arranged retainingly embracing the head portion of the blade element for facilitating attachment of the blade element to a wiper arm.

According to a preferred construction of the present invention, the resistance wire has a length substantially exceeding the length of elongation of the blade element, and the tubular member includes a plurality of parallel portions extending substantially the elongated length of the blade and spaced from one another transversely to the elongated blade length.

A plurality of holes are advantageously provided in the blade element, these holes being arranged communicating with the cavity along coextensive sides of the blade element. In this manner, water being fed into the cavity in the blade element will exit through the holes and onto a windshield, and the like, being treated.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a windshield wiper assembly according to the present invention.

FIG. 2 is a fragmentary, sectional view taken generally along the line 2—2 of FIG. 1.

FIG. 3 is a sectional view taken generally along the line 3—3 of FIG. 2.

FIG. 4 is a fragmentary, perspective view showing a portion of the heating element according to the present invention.

FIG. 5 is a fragmentary, perspective view similar to the left end of FIG. 1, but drawn to a larger scale and having some parts removed.

FIG. 6 is a fragmentary, bottom plan view of the wiper blade element according to the present invention.

DESCRIPTION OF THE PREFERRED EMBODIMENT

Referring now more particularly to FIGS. 1 through 3 of the drawings, a heated windshield wiper assembly 10 according to the present invention has a heat resistant flexible blade element 12 provided with an internal cavity 14 arranged for receiving water and similar fluids. An electrical heating arrangement 16 is encased in element 12 for uniformly distributing heat throughout element 12 and heating water (not shown) in cavity 14. As illustrated, heating arrangement 16 is advantageously arranged in cavity 14, and arrangement 16 includes a resistance wire 18 connectible to the, for example, electrical system (not shown) of the vehicle (not shown) on which assembly 10 is used as by a coupling arrangement 20 arranged for establishing a grounded electrical connection to resistance wire 18.

The heating arrangement further includes a heat distributing element in the form of a flexible, tubular member 22 encased in element 12, as by being arranged in cavity 14, and constructed from a suitable, known non-conductive material. It is to be understood that by non-conductive as used herein and in the claims, is meant non-electrically conducting materials, many suitable such materials being known to those skilled in the art. Member 22 is arranged extending in a folded condition along the length of plate element 12 for flexing therewith. Resistance wire 18 is arranged extending through tubular member 22 for generating heat in response to a flow of electrical current through wire 18. Blade element 12 is elongated, as illustrated, with resistance wire 18 also being elongated and having a length substantially exceeding the elongated length of element 12. Member 22 includes a plurality of parallel portions, or legs, extending substantially the elongated length of blade element 12 and spaced from one another transversely to the elongated blade length. Wire 18 has opposite end portions 24 and 26 arranged projecting from member 22 at the ends of the latter. End portion 24 is illustrated as connected to a lead-in connection 28, while end portion 26 may be connected to a suitable ground wire 30. It will be appreciated that while ground wire 30 may be connected to a vehicle (not shown) with which assembly 10 is employed, wire 30 may also be attached to the holder of assembly 10 to be described below.

As perhaps can best be seen from FIG. 4 of the drawings, heating arrangement 16 still further includes a non-conductive coil 32 arranged encircling member 22 for holding the latter in the illustrated folded condition such that member 22 will uniformly distribute heat transferred thereto from resistance wire 18. Coil 32 is also advantageously completely encased in element 12 as by being arranged entirely in cavity 14 of element 12.

Lead-in connection 28 includes a flexible non-conductive tube 34, with ground wire 30 and a conductor wire 26 coiled about tube 34 and each held in electrical contact by coupling arrangement 20 with a respective one of the end portions 24, 26 of wire 18. Conductive, tubular coupling elements 37, 37' electrically connect the wire 30 and conductor 36 to end portions 24, 26, and thus form arrangement 20. A heat resistant sheathing 38, which is also constructed from conventional materials commonly used for such purposes, encases the coiled conductors 30 and 36 and extends into the opening in the end of element 12 which communicates with cavity 14. Blade element 12 is provided with a head portion 40, and an electrically conductive, rigid blade holder 42 is arranged retainingly embracing portion 40 for permitting attachment of blade element 12 to a conventional windshield wiper arm (not shown).

Referring now to FIGS. 3 and 6 of the drawings, a plurality of holes 44 and 46 are provided in blade element 12 so as to form a pair of rows. The holes 44 and 46 are arranged communicating with cavity 14 along coextensive sides of element 12. Advantageously, the holes 44, 46 extend out of element 12 along parallel ledges 48 and 50. In this manner, water, or a similar fluid, may be fed through tubes 34 and 52 and into cavity 14 for being heated by heating arrangement 16 as desired and then forced by the continued feeding of water into cavity 14 to exit through holes 44 and 46 directly onto a windshield (not shown) being treated.

Resistance wire 18, which may be constructed from a heat and corrosion-resistant nickel base alloy that contains high percentages of chromium, is supplied with electrical current from the electrical system (not shown) of a vehicle associated with wiper assembly 10. In this manner, heat will be generated internally of blade element 12 by wire 18 and transferred therefrom through tubular member 22 for distribution within blade element 12. In order to more uniformly distribute the heat throughout the blade element 12, the non-conductive coil 32, which may be made from copper wire, and the like, encircles the parallel spaced portions of member 22 in its folded condition and is thereby operative also to hold wire 18 and tubular member 22 assembled in their folded arrangement. Thus, the entire heating arrangement 16 extends lengthwise and transversely through blade element 12 terminating in close spaced proximity to the opposite longitudinal ends of element 12 so as to dissipate heat uniformly therealong and to flex with element 12 as it moves over the windshield surface. Blade element 12 is advantageously constructed of any suitable heat resistant material such as a silicone rubber capable of withstanding extreme temperature variations as for example exemplified by a temperature range of $-85°$ to $700°F$. Encased within the lead-in sheathing 38 is the tubular coupling arrangement 20 by means of which the projecting end portion 24 of resistance wire 18 is connected to the lead-in connection 28. Blade element 12 advantageously tapers toward a relatively narrow contact end from head portion 40 in cross section. The wiper opposite head portion 40 is embraced by holder 42, which is itself generally channel-shaped in cross section and has inwardly extending portions received within aligned longitudinal grooves formed in the flexible blade element 12. Tubular member 22 may be constructed from a non-conductive material such as flexible glass or a suitable plastic, and is disposed in a folded condition within blade element 12. Multiple folds are illustrated for member 22, as member 22 has an unfolded length substantially exceeding the length of blade element 12 and yet is spaced from the blade contact end 54 and from holder 42.

Flexible, non-conductive tube 34 may be constructed from rubber, and the like, about which is coiled conductor 36, which may be copper wire and the like, through which current is conducted for supplying resistance wire 18.

The non-conductive sheathing 38, which may be constructed from the same heat resistant material as blade element 12, encases conductor 36, ground 30, and tube 34 and holds the ground 30 and conductor 36 in contact with end portions 24 and 26. Heat loss outside of that generated within blade element 12 is thereby held to a minimum.

From the foregoing description, the construction, operation, and utility of the heated wiper blade assembly 10 will be apparent. It will therefore be appreciated, that the construction of the wiper blade may be tailored to any particular installation requirements by varying the gauge of resistance wire 18, the number of folds or lengths thereof and the choice of materials available having generally the same properties as specified in connection with the various parts described. With existing materials now available and the vehicle battery sources of electrical energy in common use, the construction of the present invention provides a more practical means for producing the requisite heating. Also, the more even distribution of heat dissipated by blade assembly 10 achieves the objectives of the invention in a most efficient manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A heated windshield wiper assembly, comprising, in combination:
   a. a heat resistant flexible blade element having an internal cavity arranged for receiving water; and
   b. electrical heating means encased in the blade element for uniformly distributing heat throughout the blade element and heating water in the cavity, the heating means including:
      i. a resistance element;
      ii. coupling means for establishing a grounded electrical connection to the resistance element, the heating means further including a heat distributing element in the form of a flexible, tubular member encased in the blade element and constructed from a non-conductive material, the tubular member arranged extending in a folded condition along the length of the blade element for flexing therewith, the heating means still further including a nonconductive coil means encircling the tubular member in folded condition for holding the tubular member in its folded condition and assuring uniform distribution of heat transferred from the resistance wire throughout the blade element, the coil means being completely encased in the blade element; and
   c. a plurality of holes provided in the blade element, the holes being arranged communicating with the cavity along coextensive sides of the blade element, water being fed from the tube into the cavity in the blade element for exiting through the holes.

2. A structure as defined in claim 1, wherein the heat distributing element includes a resistance wire extending through the tubular member and arranged for generating heat in response to a flow of electrical current through the resistance wire.

3. A structure as defined in claim 2, wherein the heating means resistance wire has opposite end portions projecting from the tubular member, the end portions being respectively connected to a lead-in connection and to ground.

4. A structure as defined in claim 3, wherein the lead-in connection includes a flexible, non-conductive tube, a conductor coiled about the tube and held in electrical contact by the coupling means with one of the end portions of the resistance wire within the blade element, and a heat resistant sheath encasing the coiled conductor and extending into the blade element.

5. A structure as defined in claim 4, wherein the heating means further includes a non-conductive coil means encircling the tubular member in folded condition for holding the tubular member in the folded condition and assuring uniform distribution of heat transferred from the resistance wire throughout the blade element, the coil means being completely encased in the blade element.

6. A structure as defined in claim 5, wherein the blade element has a head portion, and further including a conductive, rigid blade holder arranged retainingly embracing the head portion of the blade element.

7. A structure as defined in claim 6, wherein the blade element is elongated, the resistance wire is elongated and has a length substantially exceeding the elongated length of the blade element, and the tubular member includes a plurality of parallel portions extending substantially the elongated length of the blade element and spaced from one another transversely to the elongated blade element length.

8. A structure as defined in claim 1, wherein the blade element has a head portion, and further including a conductive, rigid blade holder arranged retainingly embracing the head portion of the blade element.

9. A structure as defined in claim 2, wherein the blade element is elongated, the resistance wire is elongated and has a length substantially exceeding the elongated length of the blade element, and the tubular member includes a plurality of parallel portions extending substantially the elongated length of the blade element and spaced from one another transversely to the elongated blade element length.

* * * * *